Figure 1:
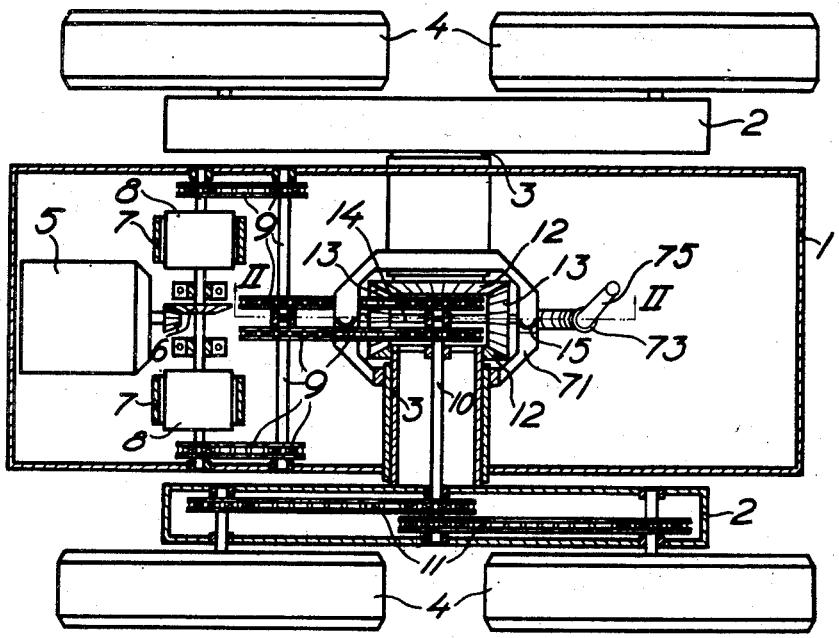

Jan. 20, 1948.  E. K. P. GRAHAM  2,434,693
VEHICLE HAVING A BODY CARRIED BY TWO OPPOSING
JOURNALS ON TWO WHEEL-SUPPORTED FRAMES
Filed Oct. 5, 1944   3 Sheets-Sheet 1

Inventor:
Edward Knut Patrik Graham
by W. Bayard Jones
Attorney

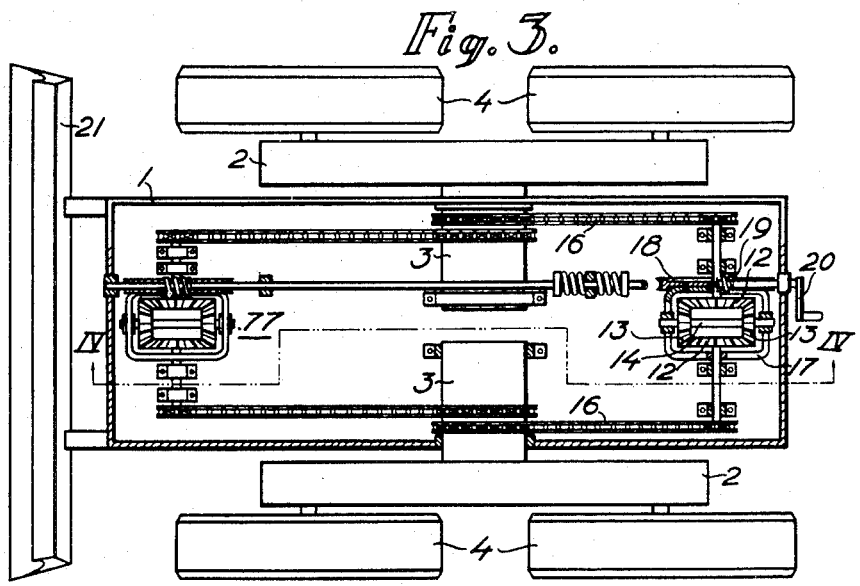
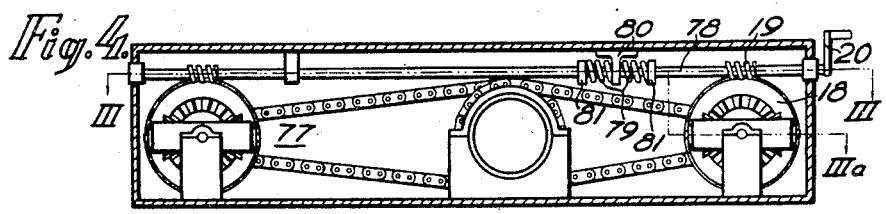
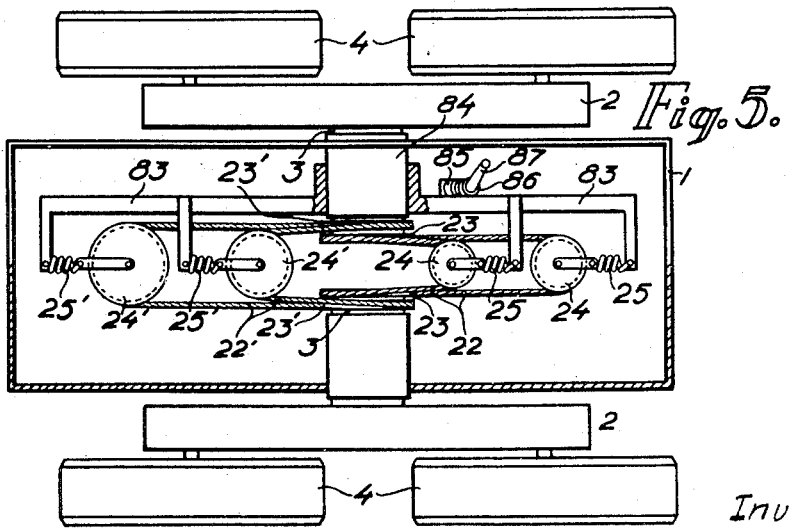

Jan. 20, 1948.    E. K. P. GRAHAM    2,434,693
VEHICLE HAVING A BODY CARRIED BY TWO OPPOSING
JOURNALS ON TWO WHEEL-SUPPORTED FRAMES
Filed Oct. 5, 1944    3 Sheets-Sheet 3

Inventor:
Edward Knut Patrik Graham
by W. Bayard Jones
Attorney.

Patented Jan. 20, 1948

2,434,693

UNITED STATES PATENT OFFICE 2,434,693

VEHICLE HAVING A BODY CARRIED BY TWO OPPOSING JOURNALS ON TWO WHEEL-SUPPORTED FRAMES

Edward Knut Patrik Graham, Stockholm, Sweden

Application October 5, 1944, Serial No. 557,290
In Sweden November 10, 1943

14 Claims. (Cl. 180—9.1)

The present invention relates to an improvement in vehicles, particularly such vehicles that are to be driven over unbeaten and wayless ground. In such vehicles it is desirable that the supporting members, such as wheels, track chains with driving wheels and rollers, or the like, are sufficiently movable to effect an even distribution of the load, and simultaneously the load shall take part as little as possible in the movements of the said supporting members. With this purpose in view some or all of the supporting members of the vehicle are arranged on or in frames or arms, each of which is pivotally attached to the body of the vehicle by means of a journal in order to enable the supporting members to adjust themselves to the surface of the ground. It has already been proposed to interconnect a pair of such frames located opposite to one another, and the journals of which should preferably, but not necessarily, have a common axis of turning, with one another and with the body of the vehicle by means of an equalizing device which allows swinging movement or rotation of the said frames relatively to the body of the vehicle and simultaneously determines the position of angular movement of the said body relatively to the said frames around the journals of the latter. Heretofore, however, the said equalizing device has been arranged below the body of the vehicle, which entails the disadvantage that when the vehicle is driven over rough ground the equalizing device will easily encounter stumps and stones which might damage the same, and which may also stop the motion of the vehicle entirely.

These disadvantages are eliminated according to the present invention which is primarily characterized by the equalizing device being provided within a closed space in the body of the vehicle above the bottom of the same. This arrangement renders it possible to provide the bottom of the body of the vehicle with a smooth lower surface, that is to say without any projecting portions which may get caught against the stumps or stones on the ground, and in this way the capability of the vehicle to make its way over rough ground is increased, and the equalizing device is also protected from being damaged by shocks and the like, as well as from dirt and dust during the driving. A further important feature of the invention is that the equalizing device is connected to the frames through the journals by means of which the frames are pivotally attached to the body of the vehicle. This arrangement renders it unnecessary to employ separate journals in the walls of the closed space for the equalizing device and special packings for such journals to effectively prevent dust and dirt from penetrating into the said space. Furthermore, it is possible in this case to employ an equalizing device of such construction that it permits an unlimited turning movement or rotation of the frames relatively to the body of the vehicle.

The present invention also provides a particular advantage in this respect that the equalizing device may easily be made adjustable relatively to the body of the vehicle in such manner that by adjustment of the said device the body of the vehicle may be tilted and adjusted relatively to the two frames around the journals of the latter without changing the mutual position of the frames, and in this way it is thus possible to adjust the position of the body of the vehicle relatively to the surface of the ground.

The accompanying drawings illustrate by way of example and somewhat diagrammatically a few constructional forms of the improvement according to the present invention.

Figure 2:
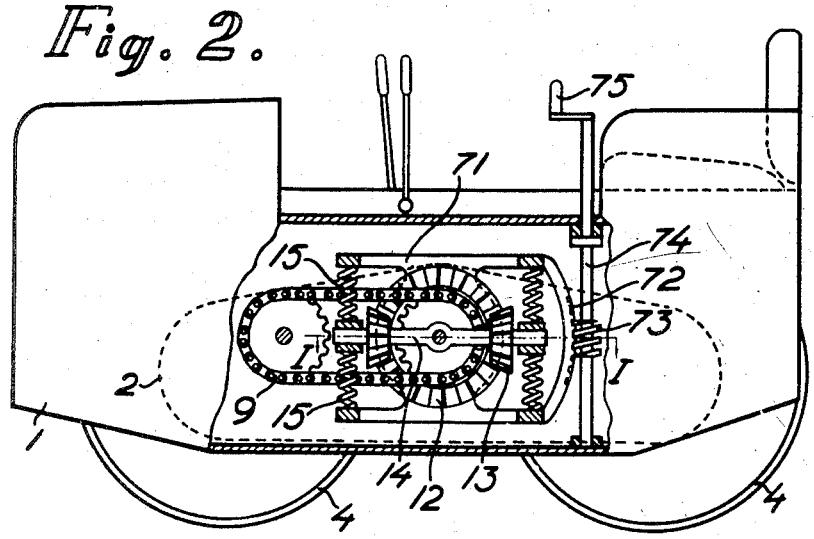
Figure 6:
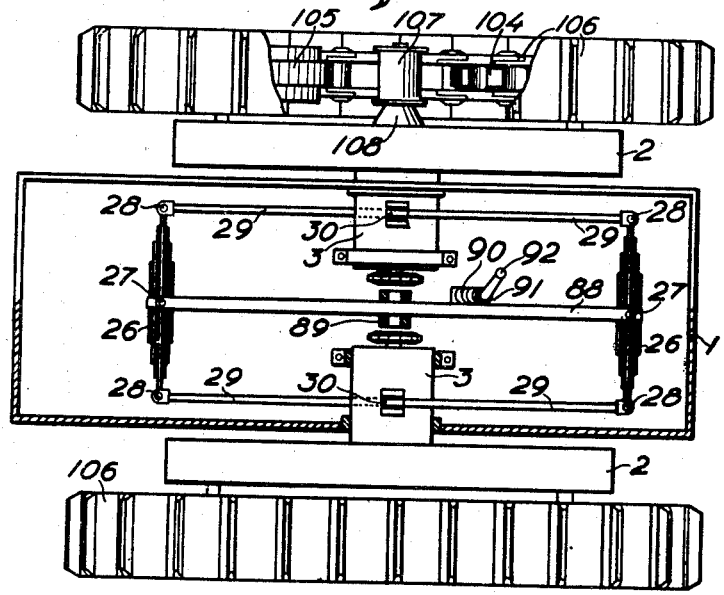
Figure 7:
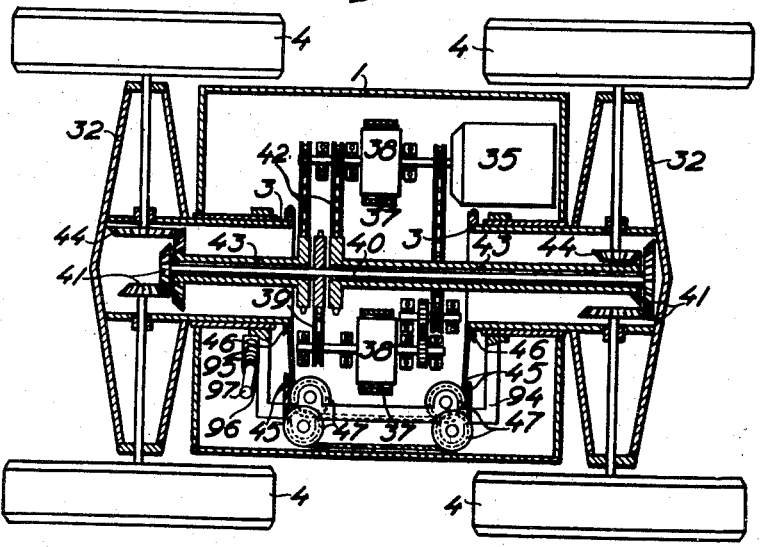

Fig. 1 shows a plan view, partly in section on the line I—I in Fig. 2, of a tractor in which the equalizing device consists of a differential gearing. Fig. 2 shows a side view of the tractor partly in section on the line II—II in Fig. 1. Fig. 3 shows a plan view, partly in section on the lines III—III and III—IIIa in Fig. 4 of a tractor or other vehicle with another constructional form of the equalizing device, and Fig. 4 shows a vertical section of the body of said tractor on the broken line IV—IV in Fig. 3. Fig. 5 shows a further constructional form in plan view, and Fig. 6 shows a plan view of a tractor having track chains with driving wheels and rollers. Fig. 7 shows a plan view of a further construction of a tractor in which the frames are pivotable around an axis which coincides with the longitudinal axis of the tractor.

In the tractor diagrammatically illustrated in Figs. 1 and 2, 1 denotes the body of the vehicle to which two frames 2 are pivotally attached by means of the journals 3 so that said frames are capable of swinging or turning relatively to the body of the vehicle. Two supporting wheels 4 are rotatably journalled in each frame 2. In this case, the said supporting wheels 4 are driving wheels also. Driving power is transmitted in a manner known per se from the engine unit 5, which comprises an engine with a clutch and a gear box, through a bevel gearing 6 to two steering clutches 8 provided with steering brakes 7, the driving power being transmitted from each of said clutches 8 through a power transmission device 9, such as chain gears and intermediate shafts, to a shaft 10 journalled in each journal 3 and from such shafts through chains 11 to the shafts of the driving wheels 4.

In this case the equalizing device consists of a differential gearing which is positioned within the body of the vehicle or in a closed space in said body, and the outer wheels 12 of which are attached to the journals 3, while the intermediate wheels 13 are provided on a shaft 14 journalled in a manner to be described here below, or on several such shafts. It will be understood that if one of the frames 2 is rotated relatively to the vehicle body 1, the wheel 12 attached to the journal 3 of such frame 2 causes the intermediate wheels 13 to rotate on the shaft 14, assuming said shaft 14 to be stationary, with the result that said intermediate wheels 13 cause the second gear wheel 12 of the differential gearing, as well as the second journal 3 and the second frame 2, to rotate but in the opposite direction to that of the first frame 2 and first wheel 12. Therefore, the two frames 2 are capable of unlimited turning or rotational movement in opposite directions relatively to the vehicle body 1. It will also be understood that if one of the frames 2 is held against rotation, as by the wheels 4 journalled in such frame resting upon the ground, then rotational movement of the other frame 2 in either direction will cause the intermediate wheels 13 to roll on the wheel 12 associated with the stationary frame 2, so that the shaft 14 of said wheels 13 performs a rotational movement in the same direction as the rotating frame 2 but through an angle only that is one-half of the angle of rotation of the rotating frame. It will be seen, therefore, that each of the frames 2 is always capable of rotational movement relatively to the other frame, so that the supporting wheels are free to adjust themselves to the surface of the ground. It will also be understood that the shaft 14 of the intermediate gears 13 will assume a position that is dependent upon the relative rotational movement of the frames 2, and that in this constructional form such position of the shaft 14 will be along the bisector of the angle which the frames 2 form with one another.

Also, since the differential gearing is provided with two intermediate wheels 13 located diametrically opposite one another, i. e. symmetrically relatively to the axis of the journals 3, it will be understood that turning movement of either of the frames 2 results in two equal torques or moments of forces being set up at the periphery of each outer wheel 12 of the gearing, and that such torques will completely balance one another, so that the bearings of the journals are not loaded by such torques.

In order to reduce the shock which, upon a rapid turning movement of one of the frames, is transmitted to the body of the vehicle, it is suitable to make the equalizing device resilient or yielding. This result may easily be accomplished with this construction of the equalizing device by providing a resilient or yielding support or bearing for the shaft 14 of the intermediate gears 13, as illustrated diagrammatically in Fig. 2, in which the shaft 14 is shown as supported by springs 15 which are inserted between the ends of said shaft and a frame 71 which is rotatably mounted on the outside of the bearing sleeves for the journals 3. Upon a shock producing a sudden turning movement of one of the frames 2, some of the springs 15 will yield and allow the shaft 14 to swing around the common axis of rotation of the journals 3, so that such shock and turning movement of the frame is not directly transmitted to the body of the vehicle. The springs 15 thus make the equalizing device resilient and shock-absorbent.

The abovementioned frame 71 is provided with an arcuate toothed rack or worm wheel segment 72 which is engaged by a worm 73 the shaft 74 of which is rotatably mounted in any suitable manner in the body 1 of the vehicle, but is incapable of moving axially relatively to said body, and which may be rotated by any suitable means diagrammatically represented by the crank 75. Rotation of the worm 73 about its shaft 74 in one direction or the other produces a relative rotational movement between said worm 73, shaft 74, and vehicle body 1, on the one hand, and the worm wheel segment 72, frame 71, intermediate gear wheels 13, and outer gear wheels 12, on the other hand. Since the outer gear wheels 12 are attached to the journals 3 of the frames 2, the supporting wheels 4 of which rest upon the ground, the outer gear wheels 12 will remain stationary, as will also the intermediate gear wheels 13, shaft 14, frame 71, and worm wheel segment 72. Consequently, rotation of the worm 73 results in a rotational or tipping movement of the vehicle body 1 about the journals 3 in one direction or the other relatively to the frames 2. It will be seen that by use of the said adjustment device, comprising the members 72, 73, 74 and 75, the position of the vehicle body relatively to the surface of the ground may be adjusted.

The constructional form illustrated in Figs. 3 and 4 differs from that above described by the outer gear wheels 12 of the differential gearing not being attached directly to the journals 3 of the frames 2 but being connected with said journals through chain gearings 16 having a suitable ratio of gearing.

The shaft 14 of the intermediate gear wheels 13 of the differential gearing is journalled in a frame or casing 17, which is rotatable about the common axis of rotation of the outer gear wheels 12, and which is connected to a worm wheel 18 which is engaged by a worm 19 the shaft 78 of which is rotatably journalled in the body 1 of the vehicle, and which may be rotated by any suitable means diagrammatically represented by the crank 20. Upon rotation of the worm 19 in one direction or the other, the worm wheel 18 and thus also the casing 17 with the intermediate gear wheels 13 will be turned around the axis of rotation of the outer gear wheels 12, with the result that said outer gear wheels 12 are also rotated relatively to the body of the vehicle. Since the supporting wheels 4 in the frames 2 rest on the surface of the ground, so that the frames 2 are incapable of turning, the body 1 of the vehicle will instead turn about the journals 3 in one direction or the other, relatively to the frames 2 and the supporting wheels 4. It is thus possible with the adjustment device above described to raise or lower the forward end of the body of the vehicle relatively to the surface of the ground, the rear end of said body being, of course, simultaneously lowered or raised. This arrangement renders it possible, therefore, to attach directly to the body 1 of the vehicle such tools, for instance dozers 21, scarifiers or the like, which must be raised and lowered relatively to the ground during the operation.

In the constructional form illustrated in Figs. 3 and 4 the vehicle is provided with a second equalizing device generally referenced 77 in the form of a differential gearing which is constructed and arranged in the same way as the differential gearing above described. This second equalizing device is located at the forward end of the vehicle body in a position symmetrical to the equalizing device first described, whereby the moments exerted by the two equalizing devices on the journals 3 will obviously balance each other, so that the bearings of the journals 3 are not loaded thereby.

Also with the constructional form illustrated in Figs. 3 and 4, the equalizing device may be yielding or resilient. For instance, the worm 19 may be resiliently supported in the body of the vehicle in such manner that it is movable in its longitudinal direction within certain limits. This is easily accomplished, as diagrammatically illustrated particularly in Fig. 4, by making the shaft 78 of the worm 19 slidable in its longitudinal direction, and by interposing springs 79 between a fixed stop or abutment 80 and two collars 81 secured to said shaft 78. It will be appreciated that with this arrangement the worm 19 will act as a longitudinally movable toothed rack, and that consequently the arrangement renders the equalizing device resilient and shock-absorbing.

It will be understood that also in this construction each equalizing device acts in the same manner as above described in connection with Figs. 1 and 2, so that rotational movement of one frame 2 relatively to the vehicle body 1 results in a rotational movement in the opposite direction of the other frame 2 relatively to the body 1, and so that the said frames are capable of unlimited and unrestricted rotational movement relatively to the frame, and each of the frames 2 is always capable of rotational movement relatively to the other frame.

In the construction illustrated in Fig. 5 the equalizing device consists of a differential means which comprises one or more flexible elements 22, for instance, in the form of a chain, a steel wire rope, or the like, which cooperates with the frames 2, in the instance illustrated by the said element running over chain wheels or rope sheaves 23 attached to the journals 3 of the frames 2, the said flexible element 22 also running over guide wheels 24 which are rotatably journalled within the body of the vehicle. The flexible element 22 runs over the wheels or sheaves on the journals 3 in such manner that the flights of the flexible member on one side of the said journals, for instance on the upper side thereof, run to one and the same guide wheel, while the flights on the lower side run to the other guide wheel. If one of the frames 2 is turned relatively to the vehicle body 1, one of the flights of the flexible member 22 runs up on the sheave 23 on the journal 3 of said frame, so that a pull is produced in said flight which is transmitted over the corresponding guide wheel 24 to the corresponding flight of the flexible member which cooperates with the sheave 23 attached to the journal 3 of the second frame 2, so that said second frame 2 will be turned in the opposite direction relatively to the body of the vehicle. When an endless flexible member 22 is used which runs over both sheaves 23 and both guide wheels 24, as above stated, it will be seen that the frames 2 are capable of unrestricted turning movement relatively to the body 1 of the vehicle. Also in this case the equalizing device may be made resilient or yielding in order to reduce shocks on the body of the vehicle, by providing a resilient support for the guide wheels, as diagrammatically represented at 25 in the drawing.

The resilient supports 25 for the guide wheels 24 are shown as supported in a frame 83 which is rotatably mounted on the bearing sleeve 84 for the journal 3 of one of the frames 2. Attached to said frame 83 is an arcuate toothed rack or worm wheel segment 85 which is engaged by a worm 86, which is rotatably supported in the body 1 of the vehicle in any suitable manner, for instance similarly to that diagrammatically illustrated in Fig. 2, and which may be rotated by means of any suitable means diagrammatically represented by the crank 87. It will be understood that rotation of the worm 86 will result in a relative turning movement between the body 1 and the frame 83, so that in this way the vehicle body 1 may be adjusted relatively to the surface of the ground in the same manner as that above described with reference to Figs. 1 and 2, and Figs. 3 and 4. Fig. 5 also shows diagrammatically a second equalizing device, comprising flexible elements 22', chain wheels or rope sheaves 23' on the journals 3, guide wheels 24' and resilient supports 25' for said wheels supported in the frame 83. This second equalizing device is located in a position symmetrical to the equalizing first described, whereby the moments exerted by the two equalizing devices will balance each other.

In the construction illustrated in Fig. 6, the tractor is provided with track chains 106, each of which runs around a driving wheel 104 rotatably journalled in frame 2 and a guide wheel 105 also rotatably journalled in frame 2. A roller 107 bears against the lower flight of each track chain 106, said roller 107 being rotatably supported by a bracket 108 projecting from the frame 2, as shown at the top of the figure where a portion of the upper flight of the track chain is broken away. The equalizing device consists of one or more balance-beams 26, two such beams being illustrated in the drawing, each such balance-beam being pivotally journalled within the body 1 of the vehicle at a point 27, and each balance beam being connected on either side of the said pivot point at its ends 28 by means of preferably stiff links 29 to the journals 3 of the frames 2 at the points 30 on the said journals. It will easily be understood that upon either frame turning relatively to the body of the vehicle, the other frame will be turned in the opposite direction relatively to said body, so that also in this case the body of the vehicle will assume a mean angular position between the frames. The balance-beams 26 may be made resilient, for instance in the shape of leaf springs, as diagrammatically illustrated in the drawing, in which way the equalizing device becomes resilient and shock-absorbing also in this case.

Owing to the links 29 from the one balance beam 26 being connected to points 30 on the lower side of the journals 3, and the links 29 from the other balance beam 26 being connected to points 30 on the upper side of the journals 3, the turning moments are balanced without the bearings of the journals being loaded thereby.

As diagrammatically illustrated in Fig. 6, the central pivot points 27 of both balance beams 26 are carried by a frame 88 which is pivotally supported at 89 in axial alignment with the journals 3 of the frames 2. Attached to said frame 88 is an arcuate toothed rack 90 which meshes with a worm 91, rotatably mounted in the body 1 in any suitable manner, for instance as diagrammatically illustrated in Fig. 2, and which may be rotated by any suitable means diagrammatically represented by the crank 92. It will be understood that by rotating said worm 91 the position of the vehicle body relatively to the surface of the ground may be adjusted in the same manner as explained in connection with the constructional forms above described.

Fig. 7 shows a construction in which the frames 32 are arranged transversely to the longitudinal direction of the body 1 of the vehicle, the common axis of turning of the journals 3 of the frames 32 coinciding with the longitudinal axis of the body of the vehicle. As in the construction illustrated in Fig. 1, driving power is transmitted from the engine unit 35 to two steering clutches 38 provided with steering brakes 37, and from one of said clutches through a chain gearing 39 to the central shaft 40 which, through bevel gearings 41, drives the driving wheels 4 on one side of the vehicle, driving power from the other steering clutch 38 being transmitted through chain gearings 42 to two tubular shafts 43 and from these shafts through bevel gearings 44 to the driving wheels 4 on the other side of the vehicle. In this case the equalizing device is shown as comprising a flexible element 45, for instance a chain, which runs over chain wheels 46 on the journals 3 of the frames 32 and over guide wheels 47 journalled in a frame 94 within the body of the vehicle. This equalizing device will, of course, operate in the same manner as that above described in connection with Fig. 5. In other words, rotation of one of the frames 32 relatively to the vehicle body 1 produces a pull in one of the flights of the flexible element 45 which causes a corresponding rotation in the opposite direction of the other frame 32 relatively to the vehicle body, and if an endless flexible element 45 is used the frames 32 are capable of an unrestricted and unlimited turning movement relatively to the vehicle body 1.

The frame 94 in which the guide wheels 47 are journalled, is pivotally mounted on the bearing sleeves for the journals 3, and is provided with an arcuate toothed rack 95 which is engaged by a worm 96 rotatably mounted in any suitable manner in the vehicle body 1 and adapted to be rotated by means diagrammatically represented by the crank 75. It will be understood that with this arrangement the vehicle body 1 may be adjusted relatively to the surface of the ground in a manner similar to that above described in connection with the preceding constructional forms.

I claim:

1. In a vehicle of the character described, the combination of a vehicle body, a single running gear on each of two opposite sides of said vehicle body, each of said running gears comprising a carrier frame and at least two wheels rotatably mounted in said carrier frame, each of said carrier frames having a journal attached thereto by means of which such frame is pivotally attached to said vehicle body, said journal extending into the interior of said vehicle body, and an equalizing device located within said vehicle body, said equalizing device interconnecting said journals of said carrier frames within said vehicle body in such manner that turning movement of one of said frames relatively to said vehicle body in one direction produces a turning movement of the other frame relatively to the vehicle body in the opposite direction.

2. In a vehicle of the character described, the combination of a vehicle body, a single running gear on each of two opposite sides of said vehicle body, each of said running gears comprising a carrier frame and at least two wheels rotatably mounted in said carrier frame, each of said carrier frames having a journal attached thereto by means of which such frame is pivotally attached to said vehicle body, said journal extending into the interior of said vehicle body, an equalizing device located within said vehicle body, said equalizing device interconnecting said journals of said carrier frames within said vehicle body in such manner that turning movement of one of said frames relatively to said vehicle body in one direction produces a turning movement of the other frame relatively to the vehicle body in the opposite direction, and said equalizing device permitting unlimited swinging movement of said carrier frames relatively to said vehicle body.

3. In a vehicle of the character described, the combination of a vehicle body, a single running gear on each of two opposite sides of said vehicle body, each of said running gears comprising a carrier frame and at least two wheels rotatably mounted in said carrier frame, each of said carrier frames having a journal attached thereto by means of which such frame is pivotally attached to said vehicle body, said journal extending into the interior of said vehicle body, and a resilient equalizing device located within said vehicle body, said equalizing device interconnecting said journals of said carrier frames within said vehicle body in such manner that turning movement of one of said frames relatively to said vehicle body in one direction produces a turning movement of the other frame relatively to the vehicle body in the opposite direction.

4. In a vehicle of the character described, the combination of a vehicle body, a single running gear on each of two opposite sides of said vehicle body, each of said running gears comprising a carrier frame and at least two wheels rotatably mounted in said carrier frame, each of said carrier frames having a journal attached thereto by means of which such frame is pivotally attached to said vehicle body, said journal extending into the interior of said vehicle body, an equalizing device located within said vehicle body, said equalizing device interconnecting said journals of said carrier frames within said vehicle body in such manner that turning movement of one of said frames relatively to said vehicle body in one direction produces a turning movement of the other frame relatively to the vehicle body in the opposite direction, said equalizing device being adjustable relatively to said vehicle body, and means for adjusting said equalizing device relatively to said vehicle body whereby said body may be tilted about said journals of said carrier frames and may be adjusted relatively to said frames without changing the mutual position of said frames.

5. In a vehicle of the character described, the combination of a vehicle body, a single running gear on each of two opposite sides of said vehicle body, each of said running gears comprising a carrier frame and at least two wheels rotatably mounted in said carrier frame, each of said carrier frames having a journal attached thereto by means of which such frame is pivotally attached to said vehicle body, said journal extending into the interior of said vehicle body, a resilient equalizing device located within said vehicle body, said equalizing device interconnecting said journals of said carrier frames within said vehicle body in such manner that turning movement of one of said frames relatively to said vehicle body in one direction produces a turning movement of the other frame relatively to the vehicle body in the opposite direction, said equalizing device being adjustable relatively to said vehicle body, and means for adjusting said equalizing device relatively to said vehicle body whereby said body may be tilted about said journals of said carrier frames and may be adjusted relatively to said frames without changing the mutual position of said frames.

6. In a vehicle of the character described, the combination of a vehicle body, a single running gear on each of two opposite sides of said vehicle body, each of said running gears comprising a carrier frame and at least two wheels rotatably mounted in said carrier frame, each of said carrier frames having a journal attached thereto by means of which such frame is pivotally attached to said vehicle body, said journal extending into the interior of said vehicle body, at least one equalizing device located within said vehicle body, said equalizing device interconnecting said journals of said carrier frames within said vehicle body in such manner that turning movement of one of said frames relatively to said vehicle body in one direction produces a turning movement of the other frame relatively to the vehicle body in the opposite direction, said equalizing device consisting of a differential gearing, the outer wheels of said gearing being connected to said journals of said carrier frames, and the intermediate wheel of said gearing being mounted upon a shaft in said vehicle body.

7. A vehicle as defined in claim 6, wherein the differential gearing comprises a frame in which the intermediate wheel of said gearing is journalled, and means for adjusting the position of said frame relatively to said vehicle body.

8. In a vehicle of the character described, the combination of a vehicle body, a single running gear on each of two opposite sides of said vehicle body, each of said running gears comprising a carrier frame and at least two wheels rotatably mounted in said carrier frame, each of said carrier frames having a journal attached thereto by means of which such frame is pivotally attached to said vehicle body, said journal extending into the interior of said vehicle body, an equalizing device located within said vehicle body, said equalizing device interconnecting said journals of said carrier frames within said vehicle body in such manner that turning movement of one of said frames relatively to said vehicle body in one direction produces a turning movement of the other frame relatively to the vehicle body in the opposite direction, said equalizing device consisting of at least one differential means, said differential means comprising at least one flexible element running over said journals of said carrier frames, engagement means on said journals for effecting driving engagement between said flexible element and said journals, and guide wheels for said flexible element mounted in said vehicle body.

9. A vehicle as defined in claim 8, comprising means for yieldingly supporting said guide wheels in said vehicle body.

10. A vehicle as defined in claim 8, comprising a frame in which said guide wheels of said differential means are journalled, and means for adjusting said frame relatively to said vehicle body.

11. In a vehicle of the character described, the combination of a vehicle body, a single running gear on each of two opposite sides of said vehicle body, each of said running gears comprising a carrier frame and at least two wheels rotatably mounted in said carrier frame, each of said carrier frames having a journal attached thereto by means of which such frame is pivotally attached to said vehicle body, said journal extending into the interior of said vehicle body, an equalizing device located within said vehicle body, said equalizing device interconnecting said journals of said carrier frames within said vehicle body in such manner that turning movement of one of said frames relatively to said vehicle body in one direction produces a turning movement of the other frame relatively to the vehicle body in the opposite direction, said equalizing device comprising at least one balance beam, said beam being pivotally connected at one point to said vehicle body, and means connecting one point on either side of such pivot point to one of said journals of said carrier frames.

12. In a vehicle of the character described, the combination of a vehicle body, a single running gear on each of two opposite sides of said vehicle body, each of said running gears comprising a carrier frame and at least two wheels rotatably mounted in said carrier frame, each of said carrier frames having a journal attached thereto by means of which such frame is pivotally attached to said vehicle body, said journal extending into the interior of said vehicle body, and an equalizing device located within said vehicle body, said equalizing device interconnecting said journals of said carrier frames within said vehicle body in such manner that turning movement of one of said frames relatively to said vehicle body in one direction produces a turning movement of the other frame relatively to the vehicle body in the opposite direction, said equalizing device comprising at least one resilient balance beam, said beam being pivotally connected at one point to said vehicle body, and means connecting one point on either side of such pivot point to one of said journals of said carrier frames.

13. A vehicle as defined in claim 12, comprising a frame adjustable relatively to said vehicle body, said resilient balance beam being connected at its pivot point to said frame, and means for adjusting said frame relatively to said vehicle body.

14. A vehicle as defined in claim 1, comprising at least one additional equalizing device located within said vehicle body and interconnecting said journals of said carrier frames within said vehicle body in such manner that turning movement of one of said frames relatively to said vehicle body in one direction produces a turning movement of the other frame relatively to the vehicle body in the opposite direction, all equalizing devices being arranged symmetrically relatively to said journals of said carrier frames in such manner that the torques produced by said equalizing devices about the axis of said journals are completely balanced.

EDWARD KNUT PATRIK GRAHAM.

REFERENCES CITED

The following references are of record in the file of this patent:

UNITED STATES PATENTS

| Number | Name | Date |
| --- | --- | --- |
| 1,316,232 | Haupt | Sept. 16, 1919 |
| 1,627,225 | Babel et al. | May 3, 1927 |
| 1,751,394 | Christie | Mar. 18, 1930 |
| 2,089,042 | Straussler | Aug. 3, 1937 |
| 2,236,734 | Ronning | Apr. 1, 1941 |

FOREIGN PATENTS

| Number | Country | Date |
| --- | --- | --- |
| 332,933 | Great Britain | July 28, 1930 |
| 380,295 | Great Britain | Sept. 15, 1932 |